(12) United States Patent  
Nomura et al.

(10) Patent No.: US 11,448,471 B2  
(45) Date of Patent: Sep. 20, 2022

(54) HEAT STORAGE UNIT, HEAT STORAGE SYSTEM, AND HEAT STORAGE METHOD

(71) Applicant: Mitsubishi Electric Corporation, Tokyo (JP)

(72) Inventors: Yasumitsu Nomura, Tokyo (JP); Shigetoshi Ipposhi, Tokyo (JP); Shunkei Suzuki, Tokyo (JP); Junichi Nakazono, Tokyo (JP); Hideharu Nobutoki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/733,897

(22) PCT Filed: Jun. 18, 2018

(86) PCT No.: PCT/JP2018/023098  
§ 371 (c)(1),  
(2) Date: Dec. 1, 2020

(87) PCT Pub. No.: WO2019/244202  
PCT Pub. Date: Dec. 26, 2019

(65) Prior Publication Data  
US 2021/0108861 A1    Apr. 15, 2021

(51) Int. Cl.  
*F28D 17/00* (2006.01)  
*F28D 20/00* (2006.01)

(52) U.S. Cl.  
CPC ......... *F28D 17/00* (2013.01); *F28D 20/0034* (2013.01); *F28D 2020/006* (2013.01)

(58) Field of Classification Search  
CPC . F28D 17/00; F28D 20/0034; F28D 2020/006  
(Continued)

(56) References Cited

U.S. PATENT DOCUMENTS 5,584,193 A * 12/1996 Biermann .............. C09K 5/047  
62/476  
9,410,747 B2 * 8/2016 Kim ...................... F28D 20/023  
(Continued)

FOREIGN PATENT DOCUMENTS

CN    107435970 A    12/2017  
CN    206755315 U    12/2017  
(Continued)

OTHER PUBLICATIONS

Extended European Search Report dated May 28, 2021 issued in corresponding European patent application No. 18923091.5.  
(Continued)

*Primary Examiner* — Jon T. Schermerhorn, Jr.  
(74) *Attorney, Agent, or Firm* — Xsensus LLP

(57) ABSTRACT

A heat storage unit includes: a heat storage material that contains water and high polymers that exhibit hydrophilicity or hydrophobicity depending on a temperature; a heat exchanger that causes heat exchange to be performed between a heating fluid and the heat storage material to heat the heat storage material and store heat in the heat storage material, and causes heat exchange to be performed between a heat utilization fluid and the heat storage material to receive heat from the heat storage material and cause heat to be transferred from the heat storage material; and a container that is filled with the heat storage material and houses the heat exchanger.

15 Claims, 6 Drawing Sheets

(58) Field of Classification Search
USPC .......................................................... 165/10
See application file for complete search history.

(56) References Cited

U.S. PATENT DOCUMENTS

| | | | |
|---|---|---|---|
| 10,377,936 B2* | 8/2019 | Hartmann | ............... C09K 5/063 |
| 10,752,821 B2* | 8/2020 | Shaaban | ................ F28D 20/003 |
| 2004/0046147 A1* | 3/2004 | Matsuda | ................. F28D 20/02 |
| | | | 252/70 |
| 2005/0121187 A1* | 6/2005 | Chan | ....................... F28D 17/00 |
| | | | 165/300 |
| 2017/0210196 A1* | 7/2017 | Bidner | ............... B60H 1/00492 |

FOREIGN PATENT DOCUMENTS

| | | |
|---|---|---|
| JP | 59-144377 U | 9/1984 |
| JP | 2006-232940 A | 9/2006 |
| JP | 2007-44673 A | 2/2007 |
| JP | 2012-167892 A | 9/2012 |

OTHER PUBLICATIONS

International Search Report and Written Opinion dated Sep. 4, 2018 for PCT/JP2018/023098 filed on Jun. 18, 2018, 10 pages including English Translation of the International Search Report.
Chinese Office Action dated Oct. 25, 2021 in Chinese patent application No. 201880093395.0.

* cited by examiner

HEAT STORAGE UNIT, HEAT STORAGE SYSTEM, AND HEAT STORAGE METHOD

CROSS-REFERENCE TO RELATED APPLICATIONS

The present application is based on PCT filing PCT/JP2018/023098, filed Jun. 18, 2018, the entire contents of which are incorporated herein by reference.

TECHNICAL FIELD

The present disclosure relates to a heat storage unit, a heat storage system, and a heat storage method.

BACKGROUND ART

In the past, heat storage units that store heat and are provided in a heat storage system for use as a water heater and other equipment have been known. Patent Literature 1 discloses a heat storage material container that houses: a reaction container that houses a heat storage material, heat transfer tubes, and fins, and has opening portions at an upper part of the reaction container; and a condenser that condenses water vapor into liquid. In the heat storage material container, a water transfer passage through which condensed water is transferred is provided. Patent Literature 1 also discloses a heat storage system that includes the heat storage material container and operates as a water heater. In the heat storage material container disclosed in Patent Literature 1, water vapor transferred from the heat storage material passes through the opening portions of the reaction container, flows upwards, flows out of the reaction container, and condenses into water in the condenser. The water then passes through the water transfer passage and is stored in a water storage unit.

CITATION LIST

Patent Literature

Patent Literature 1: Japanese Unexamined Patent Application Publication No. 2012-167892

SUMMARY OF THE INVENTION

Technical Problem

However, in the heat storage material container disclosed in Patent Literature 1, the condenser and the water transfer passage are provided outside the reaction container that houses the heat storage material. Inevitably, the heat storage material container and the heat storage system including the heat storage material container are made larger.

The present disclosure is applied to solve the above problem, and relates to a heat storage unit and a heat storage system that are made smaller, and a heat storage method for use therein.

Solution to Problem

A heat storage unit according to an embodiment of the present disclosure includes: a heat storage material that contains water and high polymers that exhibit hydrophilicity or hydrophobicity depending on a temperature; a heat exchanger that causes heat exchange to be performed between a heating fluid and the heat storage material to heat the heat storage material and store heat in the heat storage material, and causes heat exchange to be performed between a heat utilization fluid and the heat storage material to receive heat from the heat storage material and cause heat to be transferred from the heat storage material; and a container that is filled with the heat storage material and houses the heat exchanger.

Advantageous Effects of Invention

According to an embodiment of the present disclosure, a heat storage unit includes a heat storage material that contains water and high polymers exhibiting hydrophilicity or hydrophobicity depending on a temperature, in addition to a heat exchanger and a container. During heat storage in the heat storage material and heat transfer from the heat storage material, water is in a liquid state. It is therefore unnecessary to provide a condenser that condenses and liquefies water vapor and a water transfer passage through which liquid water obtained by the above liquefying flows. The heat storage unit can therefore be made smaller.

DESCRIPTION OF EMBODIMENTS

Embodiment 1

Figure 1:
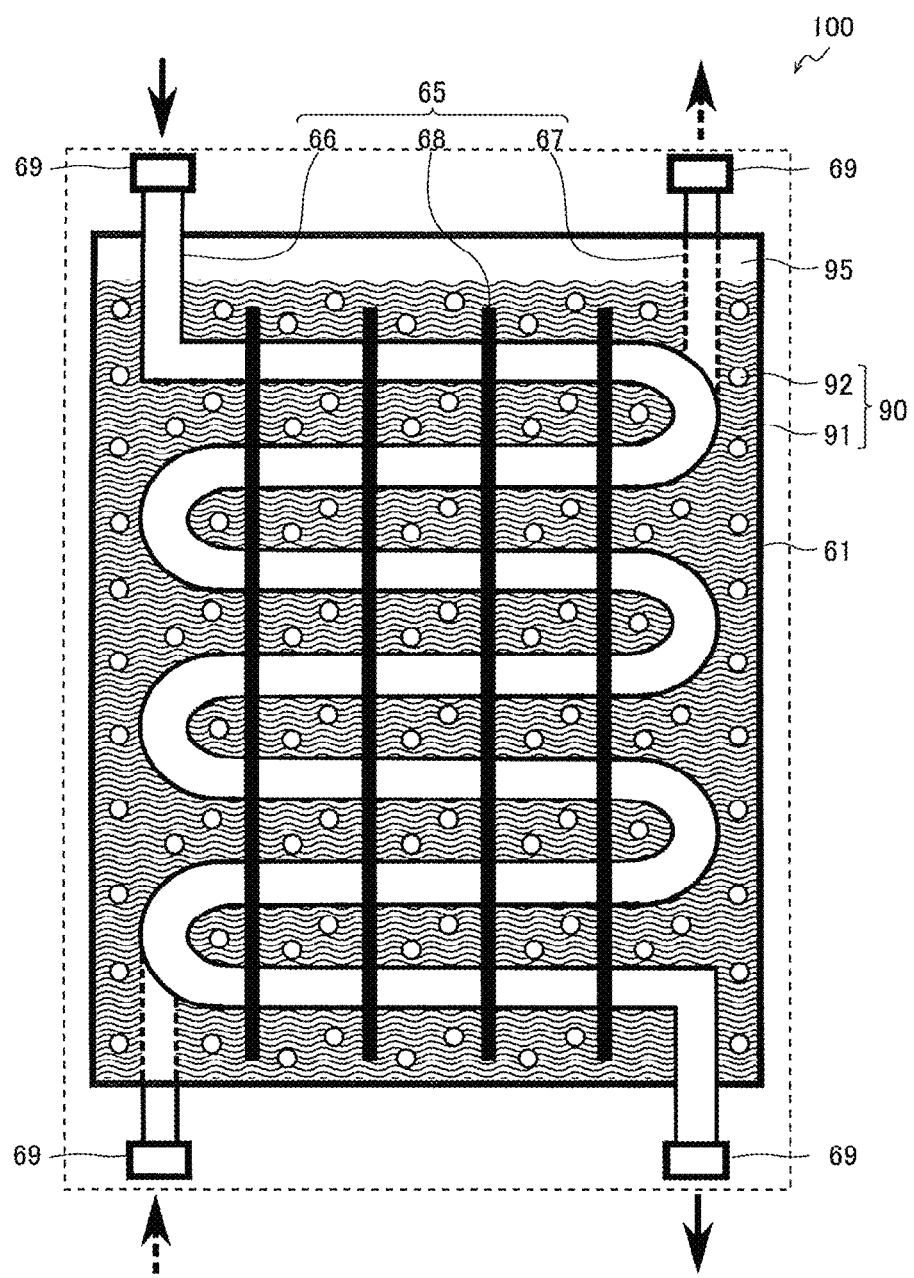
FIG. 1 is a schematic view of a heat storage unit 100 according to Embodiment 1 of the present disclosure.

A heat storage unit, a heat storage system and a heat storage method according to each of the embodiments of the present disclosure will be described with reference to the drawings. FIG. 1 is a schematic view of a heat storage unit 100 according to Embodiment 1 of the present disclosure.

Heat Storage Unit 100

As illustrated in FIG. 1, the heat storage unit 100 includes a container 61, a heat exchanger 65, and a heat storage material 90. The container 61 has, for example, a substantially cuboid shape, is made of stainless steel (SUS), and has a thickness of 1 mm. The container 61 is filled with the heat storage material 90, and an air layer 95 is provided in an uppermost region of the inside of the container 61. The container 61 houses the heat exchanger 65, and has a plurality of openings which are formed in an upper surface and a lower surface of the container 61, and into which a heating pipe 66 and a heat utilization pipe 67 of the heat exchanger 65 are inserted.

The heat exchanger 65 is, for example, a fin-and-tube heat exchanger, and includes the heating pipes 66, the heat utilization pipe 67, and a plurality of fins 68. The heating pipe 66 is, for example, a cylindrical or elongated pipe that is made of metal such as SUS or Cu. A heating fluid for heating the heat storage material 90 flows in the heating pipe 66. The heating pipes 66 is inserted into openings formed in the upper surface and the lower surface of the container 61 and located to extend in the inside and the outside of the container 61. The heating pipe 66 has joints 69 at both ends of the heating pipe 66. The type of each of the joints 69 can be changed as appropriate based on the structure of the heat storage system 500 including the heat storage unit 100. As examples of the type of each joint 69, quick fastener joints and Swagelok joints are present. Because of provision of the joints 69 at the heating pipe 66, the heat storage unit 100 can be more easily connected to the heat storage system 500.

The heat utilization pipe 67 is, for example, a cylindrical or elongated pipe made of metal such as SUS or Cu. A heat utilization fluid for receiving heat from the heat storage material 90 flows in the heat utilization pipe 67. The heat utilization pipe 67 is inserted into openings formed in the upper surface and the lower surface of the container 61 and located to extend in the inside and the outside of the container 61. The heat utilization pipe 67 has joints 69 at both ends of the heat utilization pipe 67. The type of each of the joints 69 can be changed as appropriate based on the structure of the heat storage system 500 including the heat storage unit 100. As examples of the type of each joint, 69, quick fastener joints and Swagelok joints are present. Because of provision of the joints 69 at the heat utilization pipe 67, the heat storage unit 100 can be more easily connected to the heat storage system 500.

The fins 68 are made by processing and forming, for example, metal such as SUS or Al, in the shape of a plate, and are also arranged substantially parallel to each other. The fins 68 each have a plurality of openings. While extending in zigzag, the heating pipe 66 and the heat utilization pipe 67 are inserted into the openings of the fins 68 arranged substantially parallel to each other. The heat exchanger 65 causes heat exchange to be performed between the heating fluid and the heat storage material 90 to heat the heat storage material 90, and store heat in the heat storage material 90; and also causes heat exchange to be performed between the heat utilization fluid and the heat storage material 90 such that the heat utilization fluid receives heat from the heat storage material 90, that is, heat is transferred from the heat storage material 90 to the heat utilization fluid.

Regarding Embodiment 1, it is described above by way of example by referring to the case where the heating fluid flows downwards in the vertical direction and the heat utilization fluid flows upwards in the vertical direction. However, each of the heating fluid and the heat utilization fluid may flow in any direction as long as the heating fluid and the heat utilization fluid flow in opposite directions. For example, the heating fluid may flow upwards in the vertical direction, and the heat utilization fluid may flow downwards in the vertical direction. Alternatively, the container 61 may have openings formed in side surfaces of the container 61, and the heating fluid and the heat utilization fluid may flow in the horizontal direction.

The heat exchanger 65 may have any structure as long as the heat exchanger 65 can cause the heat storage material 90 to be heated and also heat to be transferred from the heat storage material 90. The shape and material of the heat exchanger 65 can be changed as appropriate. For example, the heat exchanger 65 may be configured such that no fins 68 are provided and the heating pipe 66 and the heat utilization pipe 67 are densely arranged. Also, the heat exchanger 65 may be configured such that a layer through which the heating fluid flows, a layer through which the heat utilization fluid flows, and a layer filled with the heat storage material 90 are arranged.

The heat storage material 90 has at least high polymers 92 and water 91. The heat storage material 90 is, for example, a temperature-responsive gel. The high polymers 92 are temperature-responsive high polymers that exhibit hydrophilicity or hydrophobicity depending on a temperature. The temperature is a lower critical solution temperature (LCST) for the water 91. The high polymers 92 exhibit hydrophilicity at a temperature below the lower critical solution temperature, and exhibit hydrophobicity at a temperature above the lower critical solution temperature.

Specific examples of the high polymers 92 are: high-density cross-linked products, such as poly(N-ethyl(meth)acrylamide), poly(N-n-propyl(meth)acrylamide), poly(N-isopropyl(meth)acrylamide), poly(N-cyclopropyl(meth)acrylamide), poly(N,N-dimethyl(meth)acrylamide), poly(N-ethyl-N-methyl(meth)acrylamide), poly(N-methyl-N-n-propyl(meth)acrylamide), poly(N-isopropyl-N-methyl(meth)acrylamide), poly(N,N-diethyl(meth)acrylamide), poly(N-(meth)acryloylpyrrolidine), poly(N-(meth)acryloylpiperidine), poly(N-ethoxyethyl(meth)acrylamide), poly(N-ethyl-N-methoxyethyl(meth)acrylamide), poly(N-methoxypropyl(meth)acrylamide), poly(N-ethoxypropyl(meth)acrylamide), poly(N-isopropoxypropyl(meth)acrylamide), poly(N-methoxyethoxypropyl(meth)acrylamide), poly(N-tetrahydrofurfuryl(meth)acrylamide), poly(N-1-methyl-2-methoxyethyl(meth)acrylamide), poly(N-1-methoxymethylpropyl(meth)acrylamide), poly[N-(2,2-dimethoxyethyl)-N-methyl(meth)acrylamide], poly[N-(1,3-dioxolan-2-yl)-N-methyl(meth)acrylamide], poly[N-8-(meth)acryloyl 1,4-dioxa-8-azaspiro(4,5)decane], poly(N,N-dimethoxyethyl(meth)acrylamide), poly(N-(meth)acryloylmorpholine); and high-density cross-linked products of cohigh polymers formed by cohigh polymerization of two or more of monomers that constitute the above high-density cross-linked products. These high-density cross-linked products have a dense structure in which polymer chains can contact each other.

Preferably, the water 91 should be pure water; however, it is not indispensable that the water 91 is pure water; that is, the water 91 may be water that does not contain a component that may degrade the high polymers 92. The water 91 is classified into bound water bound to a high-density cross-linked product that corresponds to the high polymers 92 and free water that excludes bound water. Since the high polymers 92 have a hydrophilic swelling structure at a temperature below the lower critical solution temperature, bound water of the water 91 forms a stable highly-ordered molecular sequence to increase the hydrogen bonding strength. Since the high polymers 92 have a hydrophobic shrinking structure at a temperature above the lower critical solution temperature, bound water of the water 91 forms an unstable lowly-ordered molecular sequence to reduce the hydrogen bonding strength. That is, in the heat storage material 90, the hydrogen bonding strength of bound water can be enhanced or reduced in the neighborhood of the lower critical solution temperature. Since the hydrogen bonding strength of bound water in the heat storage material 90 can be varied in the neighborhood of the lower critical solution temperature, the heat storage material 90 has a large heat storage capacity corresponding to the variation of the hydrogen bonding strength. Since the heat storage material 90 has a large heat storage capacity, the filling amount of the heat storage material 90 in the container 61 can be reduced. Therefore, the heat storage unit 100 can be made smaller.

Heat Storage Operation of Heat Storage Unit 100

Next, the operation of the heat storage unit 100 will be described. First, a heat storage operation of the heat storage unit 100 will be described. When the heating fluid flows through the heating pipe 66, heat is transferred from the heating fluid to the heat storage material 90 through the heating pipe 66 and the fins 68, and the temperature of the heat storage material 90 rises. As the temperature of the water 91 contained in the heat storage material 90 rises, the water 91 expands and the volume of the water 91 increases. In the container 61, the air layer 95 is provided above the heat storage material 90, and the air in the air layer 95 is compressed such that the volume of the air decreases by the expansion of the water 91. The volume of the container 61 can thus be kept substantially constant. The container 61 may be provided with a pressure adjusting mechanism that adjusts the pressure in the container 61 when the water 91 expands. When the temperature of the high polymers 92 contained in the heat storage material 90 rises to exceed the lower critical solution temperature, the high polymers 92 shrinks. This process will be referred to as a shrinkage process. In the shrinkage process, bound water of the water 91 is made to have a lowly-ordered molecular sequence and the hydrogen bonding strength is reduced. The heat storage material 90 thus receives a hydrogen bonding energy that corresponds to the reduction of the hydrogen bonding strength. To be more specific, the high polymers 92 has a shrinkage process. In the shrinkage process, endothermic energy generated by causing bound water in the water 91 to have a lowly-ordered molecular sequence is stored in the heat storage material 90. In the shrinkage process, the water 91 is in a liquid state. The temperature of the heating fluid then drops, and the heating fluid flows out of the container 61.

In such a manner, the heat storage in the shrinkage process is performed in the container 61, and the water 91 in the shrinkage process is in a liquid state. Thus, in the heat storage unit 100, a process of evaporating the water 91 and a process of condensing the water 91 are both unnecessary. It is therefore unnecessary to provide a condenser that condenses and liquefy water vapor and a water transfer passage through which hot water obtained by the above liquefying flows. The heat storage unit 100 can thus be made smaller.

Heat Transfer Operation of Heat Storage Unit 100

Next, the heat transfer operation of the heat storage unit 100 will be described. When the heat utilization fluid flows through the heat utilization pipe 67, heat is transferred from the heat storage material 90 to the heat utilization fluid through the heat utilization pipe 67 and the fins 68, and the temperature of the heat storage material 90 drops. When the temperature of the water 91 contained in the heat storage material 90 drops, the water 91 shrinks and the volume of the water 91 decreases. It is noted that the volume of the container 61, the area of the fins 68, and the filling amount of the heat storage material 90 are designed such that the fins 68 are immersed in the heat storage material 90 even when the volume of the water 91 decreases to the minimum. When the temperature of the high polymers 92 contained in the heat storage material 90 drops to fall below the lower critical solution temperature, the high polymers 92 swell. This process will be referred to as a swelling process. In the swelling process, bound water of the water 91 is made to have a highly-ordered molecular sequence to increase the hydrogen bonding strength. The heat storage material 90 generates hydrogen bonding energy that corresponds to an increase in the hydrogen bonding strength. To be more specific, the high polymers 92 have a swelling process. In the swelling process, the exothermic energy generated by causing bound water in the water 91 to have a highly-order molecular sequence is transferred from the heat storage material 90. In the swelling process, the water 91 is in a liquid state. The temperature of the heat utilization fluid then rises, and the heat utilization fluid flows out of the container 61.

In such a manner, in the heat storage method and heat transfer method according to Embodiment 1, in the shrinkage process, heat is stored in the heat storage material 90, and in the swelling process, heat is transferred from the heat storage material 90. The heat transfer in the swelling process is performed in the container 61, and the water 91 in the swelling process is in a liquid state. Therefore, in the heat storage unit 100, a process of evaporating the water 91 and a process of condensing the water 91 are both unnecessary. It is therefore unnecessary to provide a condenser that condenses and liquefies water vapor and a water transfer passage through which hot water obtained by the above liquefying flows. The heat storage unit 100 can thus be made smaller.

As described above, in the heat storage unit 100, heat storage in the heat storage material 90 and heat transfer from the heat storage material 90 are performed in the container 61 in the shrinkage process and the swelling process of the high polymers 92. In the shrinkage process and the swelling process, the water 91 is in a liquid state, and in the heat storage unit 100, the process of evaporating the water 91 and the process of condensing the water 91 are both unnecessary. It is therefore unnecessary to provide a condenser that condenses and liquefies water vapor and a water transfer passage through which hot water obtained by the above liquefying flows. The heat storage unit 100 can thus be made smaller. The hydrogen bonding strength of bound water of water 91 in the heat storage material 90 can be varied in high level and low level, and the heat storage material 90 has a large heat storage capacity that corresponds to the variation of the hydrogen bonding strength. Therefore, the filling amount of the heat storage material 90 can be reduced, and the heat storage unit 100 can be made smaller.

In the container 61, sheets or films having a plurality of openings that are small so as not to allow passage of the high polymers 92 may be layered. As a result, it is possible to reduce movement of the high polymers 92 to an upper region or a lower region in the container 61 due to the difference in specific gravity between the high polymers 92 and the water 91.

Heat Storage System 500

Figure 2:
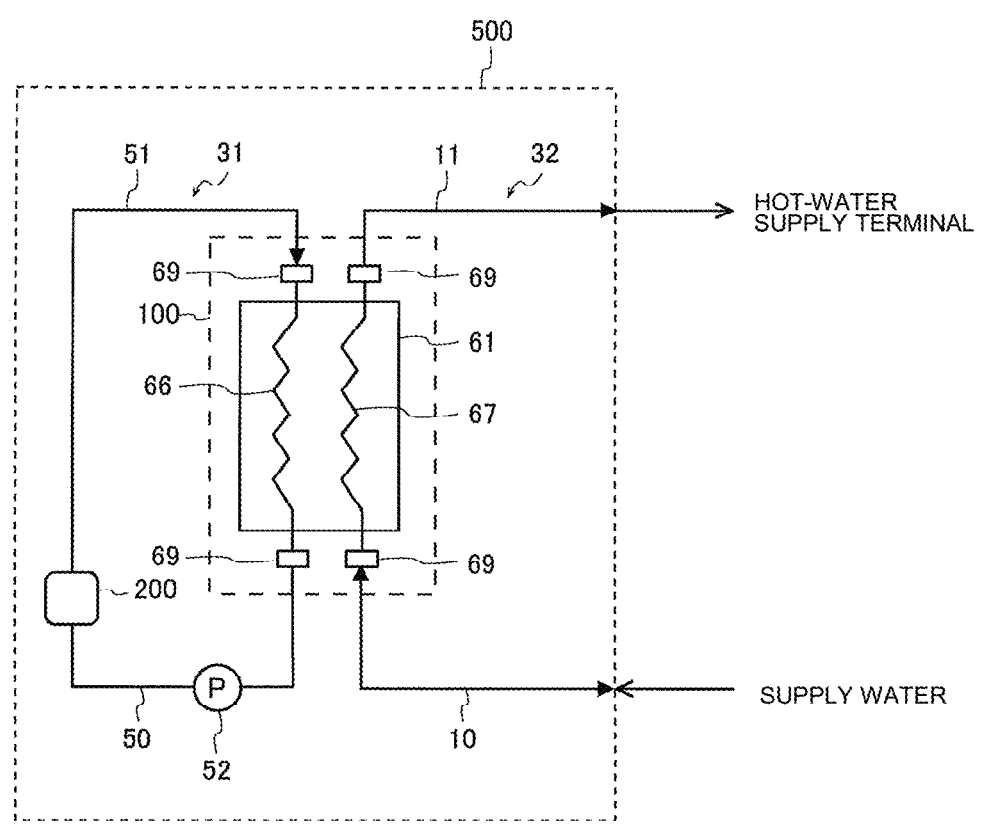
FIG. 2 is a circuit diagram of a heat storage system 500 according to Embodiment 1 of the present disclosure.

FIG. 2 is a circuit diagram illustrating the heat storage system 500 according to Embodiment 1 of the present disclosure. Next, the heat storage system 500 will be described. The heat storage system 500 includes a heat source 200, a heating pump 52, a heat storage unit 100, a heating fluid, and a heat utilization fluid. The heat source 200 is connected to a lower joint 69 of the heating pipe 66 by a water inflow pipe 50 via the heating pump 52, and the heat source 200 is connected to an upper joint 69 of the heating pipe 66 by a hot-water outflow pipe 51. As a result, a heat source circuit 31 is provided, and the heating fluid circulates in the heat source circuit 31. The heat source 200 generates heat. The heat source 200 is, for example, an electric heater or a power-driven vapor-compression heat pump. The heat source 200 heats the heating fluid that flows therein through the water inflow pipe 50. The heating pump 52 transfers the heating fluid to the heat source 200. To be more specific, the heating pump 52 transfers the heating fluid that flows through the water inflow pipe 50 to the heat source 200, and causes the heating fluid that flows out of the heat source 200 to flow to the heating pipe 66 through the hot-water outflow pipe 51. The heating fluid is, for example, water, an antifreeze such as ethylene glycol or propylene glycol, or a refrigerant such as HFC or $CO_2$.

A lower joint 69 of the heat utilization pipe 67 is connected to a water supply pipe 10 connected to a feed-water pipe through which tap water or clean water flows. It should be noted that tap water or clean water will be referred to as supply water. An upper joint 69 of the heat utilization pipe 67 is connected to a hot-water supply pipe 11, and the hot-water supply pipe 11 is connected to a heat utilization terminal. In Embodiment 1, the heat utilization terminal is a hot-water supply terminal such as a shower or a faucet. As a result, a utilization circuit 32 is provided. In Embodiment 1, the heat utilization fluid is the supply water, and the supply water passes through the utilization circuit 32, and is utilized at the hot-water supply terminal such as a shower or a faucet.

The container 61 of the heat storage unit 100 houses the heat storage material 90, and the high polymers 92 is formed to have a lower critical solution temperature of, for example, 60 degrees C.

Heat Storage Operation of Heat Storage System 500

Next, the operation of the heat storage system 500 will be described. First, the heat storage operation of the heat storage system 500 will be described. When the heating pump 52 rotates, the heating fluid flows into the heat source 200 through the water inflow pipe 50. The heating fluid that has flowed in the heat source 200 is heated in the heat source 200 such that the temperature of the heating fluid rises to, for example, 70 degrees C., and the heating fluid flows into the hot-water outflow pipe 51. The heating fluid that has flowed into the hot-water outflow pipe 51 then flows into the heating pipe 66 of the heat storage unit 100. It should be noted that the heating fluid is heated to 70 degrees C. by appropriately adjusting the rotation speed of the heating pump 52 and the heating performance of the heat source 200. The heating fluid that has a temperature of 70 degrees C. and flows through the heating pipe 66 heats the heat storage material 90, and the high polymers 92 shrinks at a temperature above 60 degrees C., which is the lower critical solution temperature. Heat is thus stored in the heat storage material 90. The heating fluid having a temperature of 70 degrees C. raises the temperature of the heat storage material 90 to around 70 degrees C.

Heat Transfer Operation of Heat Storage System 500

Next, the heat transfer operation of the heat storage system 500 will be described. Because of the use of the hot-water supply terminal, that is, the use of a shower or a faucet, the supply water that is a heat utilization fluid passes through the water supply pipe 10 and flows into the heat utilization pipe 67 of the heat storage unit 100. The supply water flows in the opposite direction to the flow direction of the heating fluid in the heat exchanger 65. The supply water has a temperature of, for example, 10 degrees C. When the supply water flows through the heat utilization pipe 67, the supply water receives heat from the heat storage material 90, and as a result the temperature of the heat storage material 90 drops. The high polymers 92 swell at a temperature below 60 degrees C., which is the lower critical solution temperature. Heat is thus transferred from the heat storage material 90. It should be noted that the supply water having a temperature of 10 degrees C. reduces the temperature of the heat storage material 90 to around 10 degrees C. Since the temperature of the heat storage material 90 is around 70 degrees C., the temperature of the supply water rises to 60 to 70 degrees C. The supply water passes through the hot-water supply pipe 11 and is utilized at the hot-water supply terminal. In order to eliminate the influence of bacteria, etc. contained in the water supply, it is preferable that the temperature of the supply water rise to 60 degrees C. or higher.

In such a manner, the heating fluid guides heat from the heat source 200 to the heat storage unit 100, and the heat storage unit 100 stores heat from the heat source 200. The heat utilization fluid guides heat from the heat storage unit 100 to the heat utilization terminal, and the heat stored in the heat storage unit 100 is utilized. For example, when the heat storage operation is performed at night, heat can be stored in the heat storage unit 100 through the operation of the heat source 200 using electric power that is inexpensive at night. The electric power charge for the heat storage system 500 can be thus reduced. In Embodiment 1, the temperature of the supply water that is the heat utilization fluid rises, and the supply water itself is utilized at the hot-water supply terminal. In other words, this is direct heat utilization in which the heat utilization fluid is directly utilized at the heat utilization terminal.

In Embodiment 1, in the heat storage operation and heat transfer operation of the heat storage system 500, the water 91 contained in the heat storage unit 100 is in a liquid state. Thus, in the heat storage system 500, the process of evaporating the water 91 and the process of condensing the water 91 are both unnecessary. It is therefore unnecessary to provide a condenser that condenses water vapor into liquid and a water transfer passage through which liquid hot water flows. The heat storage system 500 can thus be made smaller. In the heat storage operation and heat transfer operation of the heat storage system 500, the heating fluid and the heat utilization fluid flow in opposite directions in the heat storage unit 100. The efficiency of heat storage in the heat storage material and heat transfer from the heat storage material is thus high, as compared with the case where the heating fluid and the heat utilization fluid flow in the same direction. Accordingly, the volume of the heat exchanger 65 can be reduced, and the heat storage system 500 can be made further smaller.

Embodiment 2

Figure 3:
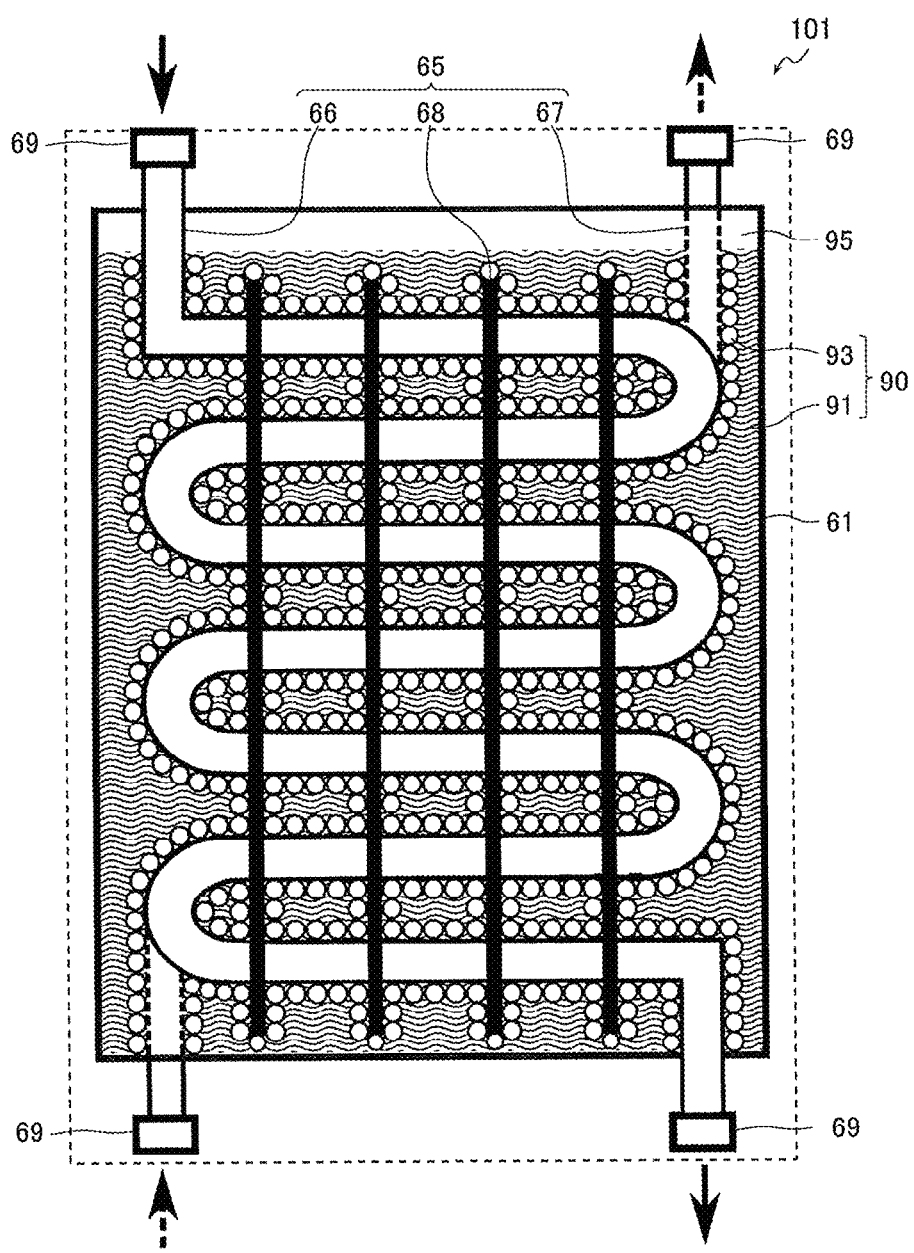
FIG. 3 is a schematic view of a heat storage unit 101 according to Embodiment 2 of the present disclosure.

FIG. 3 is a schematic view of a heat storage unit 101 according to Embodiment 2 of the present disclosure. In Embodiment 2, high polymers 93 are in contact with a surface of the heat exchanger 65. In this regard, Embodiment 2 is different from Embodiment 1. Regarding Embodiment 2, components that are the same as those in Embodiment 1 will be denoted by the same reference signs, and descriptions regarding Embodiment 1 that are also applicable as those regarding Embodiment 2 will not be repeated for Embodiment 2. Embodiment 2 will be described by referring mainly to the differences between Embodiments 1 and 2.

Heat Storage Unit 101

First, the heat storage unit 101 will be described. As illustrated in FIG. 3, the high polymers 93 are in contact with a surface of the heat exchanger 65 in the container 61. To be more specific, the high polymers 93 are in contact with a surface of at least one of the heating pipe 66, the heat utilization pipe 67, and the fins 68, which are included in the heat exchanger 65. The heating pipe 66 is made by processing and forming metal such as SUS or Cu into a cylindrical or elongated shape. The heat utilization pipe 67 is made by processing and forming, for example, metal such as SUS or Cu into a cylindrical or elongated shape. The fins 68 are made by processing and forming, for example, metal such as SUS or Al into the shape of a plate.

In general, in order to generate high polymers that are in contact with a metal surface, the metal surface is coated with a reaction solution containing at least a high polymersization initiator, a cross-linking agent, and a solvent containing monomers for the high polymers, and the reaction solution is radically polymerized. The radical polymersization can be performed by, for example, irradiating the reaction solution on the metal surface with radial rays. The reaction solution may contain an activator or coupling agent for the metal surface. In Embodiment 2, the reaction solution for the high polymers 93 is thus applied to the surface of at least one of the heating pipe 66, the heat utilization pipe 67, and the fins 68, and is then radically polymerized. As a result, the high polymers 93 come into contact with the surface of at least one of the heating pipe 66, the heat utilization pipe 67, and the fins 68, which are included in the heat exchanger 65. This state may be referred to as grafting (graftage) of the high polymers 93 to the heat exchanger 65 or may be referred to as coating of the heat exchanger 65 with the high polymers 93.

The fins 68 each have, for example, a thickness of approximately 0.1 to 1 mm, and the distance between the fins 68 is approximately 1 to 3 mm. Preferably, the thickness of high polymers 93 high polymerized and formed on the surfaces of the fins 68 should be, for example, approximately 1/5 to 1/10 of the distance between the fins 68, that is, should be approximately 0.1 to 0.6 mm. With this configuration, the high polymers 93 are high polymerized and formed on both sides of the fins 68, and the spaces between the fins 68 are filled with the water 91. That is, the thickness of the high polymers 93 high polymerized and formed on the surface of the heat exchanger 65 is based on the distance between heat-exchange surfaces of the heat exchanger 65. Thus, the filling amount of the heat storage material 90 is suitable for the heat transfer capability of the heat exchanger 65. The container 61 can therefore be made smaller, and the heat storage unit 101 can also be made smaller accordingly. The heat exchanger 65 may have any structure as long as the heat exchanger 65 can cause the heat storage material 90 to be heated and also cause heat to be transferred from the heat storage material 90. The shape and material of the heat exchanger 65 can be changed as appropriate. For example, the heat exchanger 65 may be configured such that no fins 68 are provided, and the heating pipe 66 and the heat utilization pipe 67 are densely arranged. In this case, it suffices that the distance between the heating pipe 66 and the heat utilization pipe 67 is set to several millimeters. The heat exchanger 65 may be configured such that a layer through which the heating fluid flows, a layer through which the heat utilization fluid flows, and a layer filled with the heat storage material 90 are arranged. In this case, it suffices that the distance between the layers is set to several millimeters. By arranging the layers in the vertical direction, it is possible to reduce upward or downward movement of the high polymers 93 in the container 61 due to the difference in specific gravity between the high polymers 93 and the water 91.

In the heat storage operation, when the heating fluid flows through the heating pipe 66, heat from the heating fluid is transferred to the heat storage material 90 through the heating pipe 66 and the fins 68, as in Embodiment 1. In the heat transfer operation, when the heat utilization fluid flows through the heat utilization pipe 67, heat from the heat storage material 90 is transferred to the heat utilization fluid through the heat utilization pipe 67 and the fins 68. In Embodiment 2, since the high polymers 93 are in contact with the surface of at least one of the heating pipe 66, the heat utilization pipe 67, and the fins 68, the heat transfer performance during heat storage and heat transfer is improved. Therefore, the volume of the heat exchanger 65 can be reduced, and the heat storage unit 101 can thus be made smaller. Furthermore, since the high polymers 93 are in contact with the surface of at least one of the heating pipe 66, the heat utilization pipe 67, and the fins 68, it is possible to reduce upward or downward movement of the high polymers 93 in the container 61 due to the difference in specific gravity between the high polymers 93 and the water 91.

Heat Storage System 501

Figure 4:
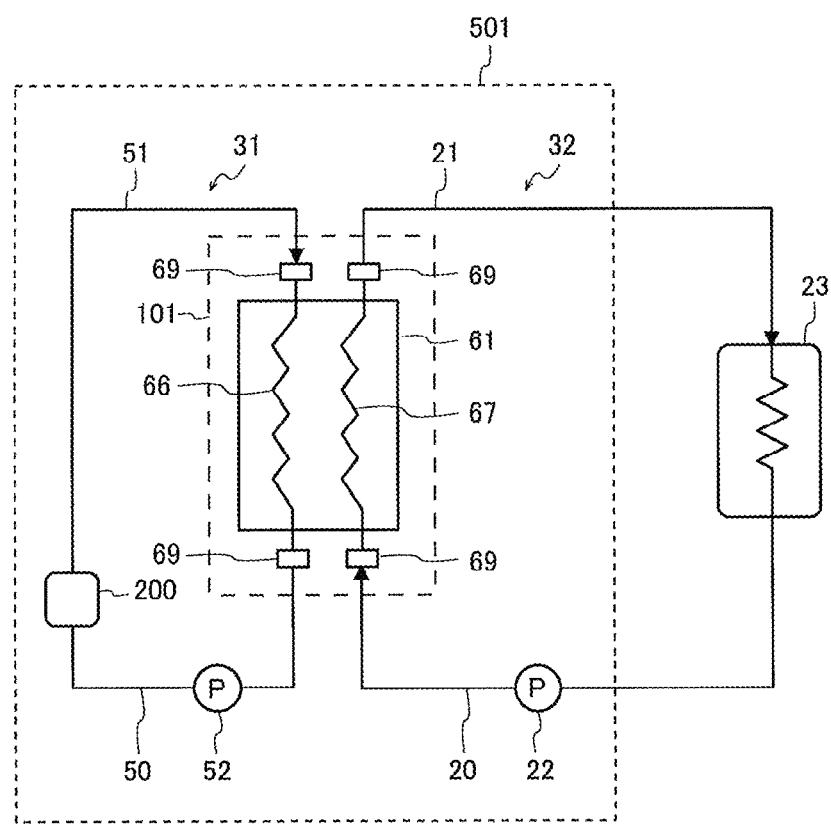
FIG. 4 is a circuit diagram of a heat storage system 501 according to Embodiment 2 of the present disclosure.

FIG. 4 is a circuit diagram illustrating a heat storage system 501 according to Embodiment 2 of the present disclosure. Next, the heat storage system 501 will be described. In Embodiment 2, a circulation pump 22 is provided in the utilization circuit 32, and the utilization circuit 32 is connected to a heat transfer terminal 23. In this regard, Embodiment 2 is different from Embodiment 1. The configuration of the heat source circuit 31 is the same as that in Embodiment 1, and the description of the heat source circuit 31 will thus be omitted. As illustrated in FIG. 4, the lower joint 69 of the heat utilization pipe 67 is connected to the heat transfer terminal 23 by a return pipe 20 via the circulation pump 22, and the upper joint 69 of the heat utilization pipe 67 is connected to the heat transfer terminal 23, which is the heat utilization terminal, by a feed pipe 21. As a result, the utilization circuit 32 is provided, and the heat utilization fluid circulates in the utilization circuit 32. The heat utilization fluid is, for example, water or an antifreeze, such as ethylene glycol or propylene glycol. The heat transfer terminal 23 is, for example, a floor heating panel, a fan coil unit, or a hot water radiator panel. The heat transfer terminal 23 is an example of the heat utilization terminal, and heat transferred from the heat utilization fluid at the heat transfer terminal 23 is utilized for air heating.

The container 61 of the heat storage unit 101 houses the heat storage material 90, and the high polymers 93 are formed to have a lower critical solution temperature of, for example, 40 degrees C.

Heat Storage Operation of Heat Storage System 501

Next, the operation of the heat storage system 501 will be described. First, the heat storage operation of the heat storage system 501 will be described. When the heating pump 52 rotates, the heating fluid flows into the heat source 200 through the water inflow pipe 50. The heating fluid that has flowed into the heat source 200 is heated in the heat source 200, whereby the temperature of the heating fluid rises to, for example, 50 degrees C., and the heating fluid flows into the hot-water outflow pipe 51. The heating fluid that has flowed into the hot-water outflow pipe 51 then flows into the heating pipe 66 of the heat storage unit 101. The heating fluid is heated to 50 degrees C. by appropriately adjusting the rotation speed of the heating pump 52 and the heating performance of the heat source 200. The heating fluid that has a temperature of 50 degrees C. and flows through the heating pipe 66 heats the heat storage material 90, and the high polymers 93 shrinks at a temperature above 40 degrees C., which is the lower critical solution temperature. As a result, heat is stored in the heat storage material 90. The heating fluid having a temperature of 50 degrees C. raises the temperature of the heat storage material 90 to around 50 degrees C.

Heat Transfer Operation of Heat Storage System 501

Next, the heat transfer operation of the heat storage system 501 will be described. When the circulation pump 22 rotates, the heat utilization fluid which has transferred heat at the heat transfer terminal 23 and whose temperature has reached a temperature of, for example, approximately 30 degrees C. passes through the return pipe 20 and flows into the heat utilization pipe 67 of the heat storage unit 101. The heat utilization fluid flows in the opposite direction to the flow direction of the heating fluid in the heat exchanger 65. The heat utilization fluid has a temperature of, for example, 30 degrees C. When the heat utilization fluid flows through the heat utilization pipe 67, the heat utilization fluid receives heat from the heat storage material 90, and the temperature of the heat storage material 90 drops. The high polymers 93 swell at a temperature below 40 degrees C., which is the lower critical solution temperature. Heat is thus transferred from the heat storage material 90. The heat utilization fluid having a temperature of 30 degrees C. reduces the temperature of the heat storage material 90 to around 30 degrees C. Since the temperature of the heat storage material 90 is in the vicinity of 50 degrees C., the temperature of the heat utilization fluid rises to approximately 40 to 50 degrees C. The heat utilization fluid passes through the feed pipe 21 and transfers heat at the heat transfer terminal 23. As described above, the heat transfer terminal 23 is, for example, a floor heating panel, and preferably, the temperature of the heat utilization fluid should be 40 to 50 degrees C.

In such a manner, the heating fluid guides heat from the heat source 200 to the heat storage unit 101, and the heat storage unit 101 stores heat from the heat source 200. The heat utilization fluid guides heat from the heat storage unit 101 to the heat utilization terminal, whereby the heat stored in the heat storage unit 101 is utilized. For example, when the heat storage operation is performed at night, the heat source 200 can be operated with electric power that is inexpensive at night, thereby to cause heat to be stored in the heat storage unit 101. Therefore, the electricity cost for the heat storage system 501 can be reduced. In Embodiment 2, the temperature of the heat utilization fluid rises, and the heat utilization fluid transfers heat at the heat transfer terminal 23. Thus, the heat utilization fluid itself is not directly utilized, and the heat from the heat utilization fluid is utilized instead. That is, this is indirect heat utilization in which the heat utilization fluid is indirectly utilized at the heat utilization terminal.

According to Embodiment 2, in the heat storage operation and heat transfer operation of the heat storage system 501, the water 91 contained in the heat storage unit 101 is in a liquid state. Since the water 91 is in a liquid state, the process of evaporating the water 91 and the process of condensing the water 91 are both unnecessary in the heat storage system 501. It is therefore unnecessary to provide a condenser that condenses and liquefies water vapor and a water transfer passage through which hot water obtained by liquefying flows. The heat storage system 501 can therefore be made smaller. It should be noted that the heat storage unit 101 according to Embodiment 2 can be used in the heat storage system 501 according to Embodiment 1, and the heat storage system 501 according to Embodiment 2 can use the heat storage unit 100 according to Embodiment 1.

Embodiment 3

Figure 5:
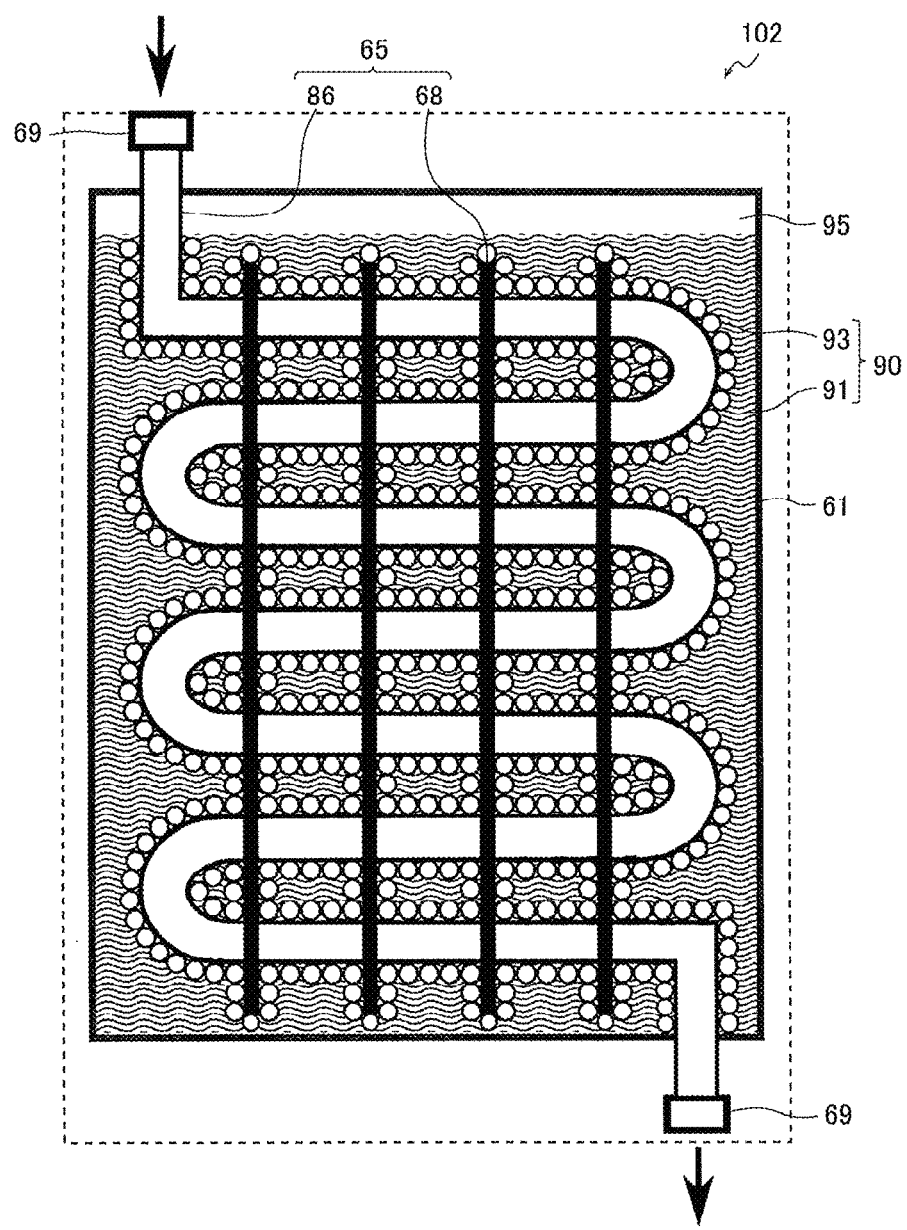
FIG. 5 is a schematic view of a heat storage unit 102 according to Embodiment 3 of the present disclosure.

FIG. 5 is a schematic view of a heat storage unit 102 according to Embodiment 3 of the present disclosure. In Embodiment 3, a single heating and heat utilization pipe 86 is provided, whereas in Embodiments 1 and 2, the heating pipe 66 and the heat utilization pipe 67 are separately provided. In this regard, Embodiment 3 is different from Embodiments 1 and 2. In Embodiment 3, components that are the same as those in Embodiment 1 and/or Embodiment 2 will be denoted by the same reference sigs, and descriptions regarding Embodiment 1 and/or Embodiment 2 that are also applicable as those regarding Embodiment 3 will not be repeated for Embodiment 3. Embodiment 3 will be described by referring mainly to the differences between Embodiments 1 and 3.

Heat Storage Unit 102

First, the heat storage unit 102 will be described. As illustrated in FIG. 5, the heating and heat utilization pipe 86 is made by processing and forming, for example, metal such as SUS or Cu into a cylindrical or elongated shape. The heating and heat utilization pipe 86 and the fins 68 are configured in the same manner as the heating pipe 66 and the fins 68 and as the heat utilization pipe 67 and the fins 68 according to Embodiments 1 and 2. During heat storage in the heat storage material 90, the heating fluid flows through the heating and heat utilization pipe 86, and heat from the heating fluid is transferred to the heat storage material 90 through the heating and heat utilization pipe 86 and the fins 68, and is stored in the heat storage material 90. On the other hand, during heat transfer from the heat storage material 90, the heat utilization fluid flows through the heating and heat utilization pipe 86 in the opposite direction to the flow direction of the heating fluid, and heat from the heat storage material 90 is transferred to the heat utilization fluid through the heating and heat utilization pipe 86 and the fins 68, that is, heat transfer from the heat storage material 90 is performed.

In Embodiment 3, it is described above by referring to by way of example the case where the heating fluid flows downwards in the vertical direction and the heat utilization fluid flows upwards in the vertical direction. However, each of the heating fluid and the heat utilization fluid may flow in any direction as long as the heating fluid and the heat utilization fluid flow in opposite directions. For example, the heating fluid may flow upwards in the vertical direction and the heat utilization fluid may flow downwards in the vertical direction. Alternatively, openings may be formed in side surfaces of the container 61, and the heating fluid and the heat utilization fluid may flow in the horizontal direction.

In Embodiment 3, the heating fluid and the heat utilization fluid both flow through the heating and heat utilization pipe 86, and heat storage and heat transfer are performed. Thus, the volume of the heat exchanger 65 can be further reduced, as compared with the case where the heating pipe 66 and the heat utilization pipe 67 are provided as separate pipes. The heat storage unit 102 can thus be made smaller.

Heat Storage System 502

Figure 6:
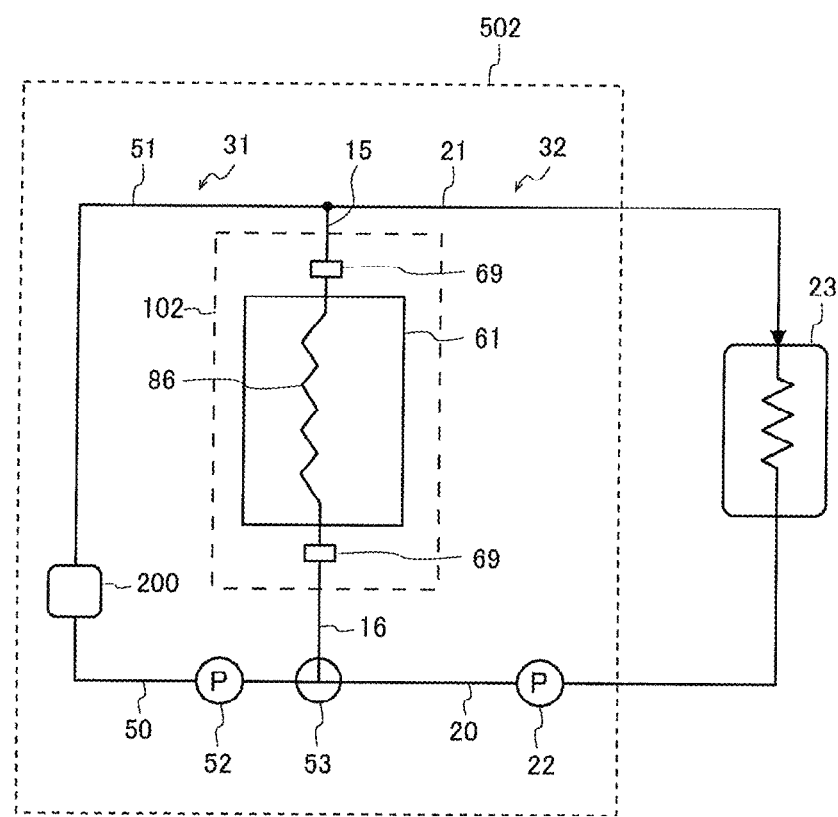
FIG. 6 is a circuit diagram of a heat storage system 502 according to Embodiment 3 of the present disclosure.

FIG. 6 is a circuit diagram illustrating a heat storage system 502 according to Embodiment 3 of the present disclosure. Next, the heat storage system 502 will be described. In Embodiment 3, the heat storage system includes a switcher 53. In this regard, Embodiment 3 is different from Embodiment 3 is different from Embodiments 1 and 2. As illustrated in FIG. 6, a lower joint 69 of the heating and heat utilization pipe 86 is connected to the switcher 53 by a lower pipe 16. The switcher 53 is connected to the heat source 200 by the water inflow pipe 50 via the heating pump 52, and the heat source 200 is connected to an upper joint 69 of the heating and heat utilization pipe 86 by the hot-water outflow pipe 51 and an upper pipe 15. As a result, the heat source circuit 31 is provided, and the heating fluid circulates in the heat source circuit 31. The switcher 53 is connected to the heat transfer terminal 23 by the return pipe 20 via the circulation pump 22, and the switcher 53 is connected to the lower joint 69 of the heating and heat utilization pipe 86 by the lower pipe 16. The upper joint 69 of the heating and heat utilization pipe 86 is connected to the heat transfer terminal 23, which is the heat utilization terminal, by the upper pipe 15 and the feed pipe 21. As a result, the utilization circuit 32 is provided, and the heat utilization fluid circulates in the utilization circuit 32. That is, the heat source circuit 31 and the utilization circuit 32 share the upper pipe 15, the upper joint 69 of the heating and heat utilization pipe 86, the heating and heat utilization pipe 86, the lower joint 69 of the heating and heat utilization pipe 86, the lower pipe 16, and the switcher 53.

The switcher 53 is, for example, a three-way valve that connects the lower pipe 16, the water inflow pipe 50, and the return pipe 20. The switcher 53 is provided upstream of the heating pump 52 in the heat source circuit 31. The switcher 53 has a function of causing two of the lower pipe 16, the water inflow pipe 50, and the return pipe 20, which are connected to the switcher 53, to communicate with each other, and shutting off the remaining one of the above pipes. The switcher 53 also has a function of causing all the lower pipe 16, the water inflow pipe 50, and the return pipe 20, which are connected to the switcher 53, to communicate with each other. It should be noted that the heating fluid and the heat utilization fluid are the same kind of fluid, and, for example, water or an antifreeze, such as ethylene glycol or propylene glycol.

Heat Storage Operation of Heat Storage System 502

Next, the operation of the heat storage system 502 will be described. First, the heat storage operation of the heat storage system 502 will be described. The switcher 53 causes the lower pipe 16 and the water inflow pipe 50 to communicate with each other, and shuts out the flow of the fluid to the return pipe 20, that is, shuts off the utilization circuit 32. When the heating pump 52 rotates, the heating fluid flows into the heat source 200 through the lower pipe 16 and the water inflow pipe 50. The heating fluid that has flowed in the heat source 200 is heated in the heat source 200, whereby the temperature of the heating fluid rises to, for example, 50 degrees C., and the heating fluid flows into the hot-water outflow pipe 51. Since the utilization circuit 32 is shut off by the switcher 53, the heating fluid flows from the hot-water outflow pipe 51 into the upper pipe 15 without flowing into the feed pipe 21, and then flows into the heating and heat utilization pipe 86 of the heat storage unit 102. The heating fluid is heated to 50 degrees C. by appropriately adjusting the rotation speed of the heating pump 52 and the heating performance of the heat source 200. The heating fluid that has a temperature of 50 degrees C. and flows through the heating and heat utilization pipe 86 heats the heat storage material 90, and the high polymers 93 shrinks at a temperature above 40 degrees C., which is the lower critical solution temperature. Thus, heat is stored in the heat storage material 90. It should be noted that the heating fluid having a temperature of 50 degrees C. raises the temperature of the heat storage material 90 to around 50 degrees C.

Heat Transfer Operation of Heat Storage System 502

Next, the heat transfer operation of the heat storage system 502 will be described. The switcher 53 causes the lower pipe 16 and the return pipe 20 to communicate with each other, and shut out the flow of the fluid to the water inflow pipe 50, that is, shuts off the heat source circuit 31. When the circulation pump 22 rotates, the heat utilization fluid that has transferred heat at the heat transfer terminal 23 and reaches a temperature of, for example, approximately 30 degrees C. flows to the switcher 53 through the return pipe 20. Since the heat source circuit 31 is shut off by the switcher 53, the heat utilization fluid flows from the return pipe 20 into the lower pipe 16 without flowing into the water inflow pipe 50, and then flows into the heating and heat utilization pipe 86 of the heat storage unit 102. The heat utilization fluid flows in the opposite direction to the flow direction of the heating fluid during heat storage in the heat exchanger 65. The temperature of the heat utilization fluid is, for example, 30 degrees C. When the heat utilization fluid flows through the heating and heat utilization pipe 86, the heat utilization fluid receives heat from the heat storage material 90, and the temperature of the heat storage material 90 drops. The high polymers 93 swell at a temperature below 40 degrees C., which is the lower critical solution temperature. Heat is thus transferred from the heat storage material 90. It should be noted that the heat utilization fluid having a temperature of 30 degrees C. reduces the temperature of the heat storage material 90 to around 30 degrees C. Since the temperature of the heat storage material 90 is around 50 degrees C., the temperature of the heat utilization fluid rises to approximately 40 to 50 degrees C. Since the heat source circuit 31 is shut off by the switcher 53, the heat utilization fluid flows from the upper pipe 15 into the feed pipe 21 without flowing into the hot-water outflow pipe 51, and then transfers heat at the heat transfer terminal 23.

In such a manner, the heating fluid guides heat from the heat source 200 to the heat storage unit 102, and the heat storage unit 102 stores heat from the heat source 200. The heat utilization fluid guides heat from the heat storage unit 102 to the heat utilization terminal, whereby the heat stored in the heat storage unit 102 is utilized. For example, when the heat storage operation is performed at night, the operation of the heat source 200 can be performed using electric power that is inexpensive at night, to cause heat to be stored in the heat storage unit 102. The electricity cost for the heat storage system 502 can be thus reduced.

In Embodiment 3, in the heat storage operation and heat transfer operation of the heat storage system 502, the water 91 contained in the heat storage unit 102 is in a liquid state. Since the water 91 is in a liquid state, the process of evaporating the water 91 and the process of condensing the water 91 in the heat storage system 502 are both unnecessary. It is therefore unnecessary to provide a condenser that condenses water vapor into liquid and a water transfer passage through which liquid hot water flows. The heat storage system 502 can thus be made smaller. In the heat storage operation and heat transfer operation of the heat storage system 502, the heating fluid and the heat utilization fluid flow in opposite directions in the heat storage unit 102. The efficiency of heat storage in the heat storage material and heat transfer from the heat storage material is high, as compared with the case where the heating fluid and the heat utilization fluid flow in the same direction. Therefore, the volume of the heat exchanger 65 can be reduced, and the heat storage system 502 can thus be made further smaller.

Simultaneous Heat Transfer Operation of Heat Storage System 502

Next, the simultaneous heat transfer operation of the heat storage system 502 will be described. The switcher 53 causes the lower pipe 16, the return pipe 20, and the water inflow pipe 50 to communicate with each other. When the circulation pump 22 rotates, the heat utilization fluid which has transferred heat at the heat transfer terminal 23 and whose temperature has reached a temperature of, for example, approximately 30 degrees C. flows into the lower pipe 16 and the water inflow pipe 50. As in the heat transfer operation, the heat utilization fluid that has flowed into the lower pipe 16 is then heated in the heat storage unit 102, whereby the temperature of the heat utilization fluid rises to, for example, approximately 45 degrees C., and the heat utilization fluid flows into the upper pipe 15. On the other hand, the heat utilization fluid that have flowed into the water inflow pipe 50 is heated in the heat source 200, whereby the temperature of the heat utilization fluid rises to, for example, 50 degrees C., and the heat utilization fluid flows into the hot-water outflow pipe 51. At a location where the hot-water outflow pipe 51 joins the upper pipe 15, the heat utilization fluid that has passed through the heat storage unit 102 and has a temperature of 45 degrees C. joins the heat utilization fluid that has passed through the heat source 200 and has a temperature of 50 degrees C. As a result, the temperature of the heat utilization fluid thus changes to, for example, 48 degrees C., and the heat utilization fluid flows in the feed pipe 21 and flows into the heat transfer terminal 23.

The heat transfer in which only heat from the heat storage unit 102 is transferred at the heat utilization terminal will be referred to as simple heat transfer, whereas the heat transfer in which heat from the heat storage unit 102 and heat from the heat source 200 are both transferred at the heat utilization terminal will be referred to as simultaneous heat transfer. In the simultaneous heat transfer, since heat from the heat source 200 can also be used as in Embodiment 3, the amount of heat transfer at the heat transfer terminal 23 can be further increased, as compared with the simple heat transfer. In addition, heat from the heat source 200 can be utilized at the heat transfer terminal 23 without passing through the heat storage unit 102, and thus a heat loss in the heat storage unit 102 can be avoided. Therefore, the heat utilization efficiency is high. It should be noted that in the heat storage unit 102 according to Embodiment 3, it is not indispensable that the high polymers 93 are in contact with the surface of the heat exchanger 65 as in Embodiment 1. The heat utilization of the heat storage system 502 according to Embodiment 3 may be direct heat utilization as in Embodiment 1.

In Embodiments 2 and 3, the heat utilization terminal may be a heat utilization terminal for use in air cooling. In this case, it suffices that the high polymers 92 are formed to have a lower critical solution temperature of, for example, 10 degrees C. Embodiment 1 may be applied to the indirect heat utilization as in Embodiments 2 and 3, and Embodiments 2 and 3 may be applied to the direct heat utilization as in Embodiment 1. The heat storage system 500 for the indirect heat utilization or the direction heat utilization can be achieved by adjusting the lower critical solution temperature of the high polymers 92 based on whether the heat utilization is indirect heat utilization or direction heat utilization.

It suffices that the heat source 200 has a function of heating an inflowing heating fluid. The heat source 200 may be configured to collect and utilize heat from natural energy such as solar heat, or to utilize waste heat discharged from factories, public baths, or homes. In this case, the energy consumption of the heat storage system 500 can be reduced. The heating pump 52 may be provided in the heat source 200. In this case, the pipe system of the heat storage system 500 can be simplified.

REFERENCE SIGNS LIST 10 water supply pipe 11 hot-water supply pipe 15 upper pipe 16 lower pipe 20 return pipe 21 feed pipe 22 circulation pump 23 heat transfer terminal 31 heat source circuit 32 utilization circuit 50 water inflow pipe 51 hot-water outflow pipe 52 heating pump 53 switcher 61 container 65 heat exchanger 66 heating pipe 67 heat utilization pipe 68 fin 69 joint 86 heating and heat utilization pipe 90 heat storage material 91 water 92 high polymer 93 high polymer 95 air layer 100, 101, 102 heat storage unit 200 heat source 500, 501, 502 heat storage system

The invention claimed is:
1. A heat storage unit comprising:
a heat storage material solution that contains water and polymers that exhibit hydrophilicity or hydrophobicity depending on a temperature;
a heat exchanger to cause heat exchange to be performed between a heating fluid and the heat storage material solution to heat the heat storage material solution and store heat in the heat storage material solution, and cause heat exchange to be performed between a heat utilization fluid and the heat storage material solution to receive heat from the heat storage material solution and cause heat to be transferred from the heat storage material solution; and
a container that is filled with the heat storage material solution and houses the heat exchanger,
wherein the heat exchanger includes,
a heating pipe through which the heating fluid flows, and
a heat utilization pipe through which the heat utilization fluid flows, and
wherein the temperature is a lower critical solution temperature for the heat storage material solution, and
the polymers exhibit hydrophilicity at a temperature below the lower critical solution temperature, and exhibit hydrophobicity at a temperature above the lower critical solution temperature.
2. The heat storage unit of claim 1, wherein heat storage and heat transfer are performed in the container.
3. The heat storage unit of claim 1,
wherein the polymers have a shrinkage process and a swelling process, and in the shrinkage process, heat is stored in the heat storage material, and in the swelling process, the heat is transferred from the heat storage material.

4. The heat storage unit of claim 3, wherein in the shrinkage process and the swelling process, the water is in a liquid state.

5. The heat storage unit of claim 1, wherein the polymers have a swelling process at a temperature below the lower critical solution temperature, and have a shrinkage process at a temperature above the lower critical solution temperature.

6. The heat storage unit of claim 1, wherein the heat storage material is a temperature-responsive gel.

7. The heat storage unit of claim 1, wherein the polymers is in contact with a surface of the heat exchanger.

8. The heat storage unit of claim 7, wherein a thickness of the polymers is based on a distance between heat-exchange surfaces of the heat exchanger.

9. The heat storage unit of claim 1, wherein the heating pipe and the heat utilization pipe are provided as a single heating and heat utilization pipe.

10. The heat storage unit of claim 1, wherein the polymers comprise one selected from the group consisting of poly(N-ethyl(meth)acrylamide), poly(N-n-propyl(meth)acrylamide), poly(N-isopropyl(meth)acrylamide), poly(N-cyclopropyl(meth)acrylamide), poly(N,N-dimethyl(meth)acrylamide), poly(N-ethyl-N-methyl(meth)acrylamide), poly(N-methyl-N-n-propyl(meth)acrylamide), poly(N-isopropyl-N-methyl(meth)acrylamide), poly(N,N-diethyl(meth)acrylamide), poly(N-(meth)acryloylpyrrolidine), poly(N-(meth)acryloylpiperidine), poly(N-ethoxyethyl(meth)acrylamide), poly(N-ethyl-N-methoxyethyl(meth)acrylamide), poly(N-methoxypropyl(meth)acrylamide), poly(N-ethoxypropyl(meth)acrylamide), poly(N-isopropoxypropyl(meth)acrylamide), poly(N-methoxyethoxypropyl(meth)acrylamide), poly(N-tetrahydrofurfuryl(meth)acrylamide), poly(N-1-methyl-2-methoxyethyl(meth)acrylamide), poly(N-1-methoxymethylpropyl(meth)acrylamide), poly[N-(2,2-dimethoxyethyl)-N-methyl(meth)acrylamide], poly[N-(1,3-dioxolan-2-yl)-N-methyl(meth)acrylamide], poly[N-8-(meth)acryloyl 1,4-dioxa-8-azaspiro(4,5)decane], poly(N,N-dimethoxyethyl(meth)acrylamide), poly(N-(meth)acryloylmorpholine), and co-polymers of two or more monomers that constitute those products thereof.

11. A heat storage system comprising:
a heat source configured to generate heat;
the heat storage unit of claim 1;
the heating fluid that guides heat generated by the heat source to the heat storage unit; and
the heat utilization fluid that guides heat stored in the heat storage unit to a heat utilization terminal.

12. The heat storage system of claim 11, wherein the heating fluid and the heat utilization fluid flow in opposite directions in the heat storage unit.

13. The heat storage system of claim 11, wherein heat transfer of the heat storage system includes,
a simple heat transfer in which heat from the heat storage unit is transferred at the heat utilization terminal, and
a simultaneous heat transfer in which heat from the heat storage unit and heat from the heat source are transferred at the heat utilization terminal.

14. The heat storage system of claim 11, wherein heat utilization at the heat utilization terminal is,
direct heat utilization in which the heat utilization fluid is directly utilized at the heat utilization terminal, or indirect heat utilization in which heat from the heat utilization fluid is utilized at the heat utilization terminal.

15. A heat storage method for a heat storage unit according to claim 1, the method comprises:
the heat storage material solution that contains water and polymers that exhibit hydrophilicity or hydrophobicity depending on a temperature;
the heat exchanger configured to cause heat exchange between the heating fluid and the heat storage material solution to heat the heat storage material solution and store heat in the heat storage material solution, and cause heat exchange between the heat utilization fluid and the heat storage material solution to receive heat from the heat storage material solution and to cause heat to be transferred from the heat storage material solution; and
the container that is filled with the heat storage material solution and houses the heat exchanger,
wherein the polymers have a shrinkage process and a swelling process,
in the shrinkage process, heat is stored in the heat storage material solution, and in the swelling process, heat is transferred from the heat storage material solution, and
the heat exchanger includes,
the heating pipe through which the heating fluid flows, and
the heat utilization pipe through which the heat utilization fluid flows.

* * * * *